(12) United States Patent
Yamada et al.

(10) Patent No.: US 8,601,802 B2
(45) Date of Patent: Dec. 10, 2013

(54) EXHAUST GAS PURIFYING DEVICE

(75) Inventors: Yasuo Yamada, Saitama (JP); Kei Kuroki, Saitama (JP); Noritaka Sekiya, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 323 days.

(21) Appl. No.: 13/057,116

(22) PCT Filed: Jul. 31, 2009

(86) PCT No.: PCT/JP2009/063662
§ 371 (c)(1),
(2), (4) Date: Feb. 1, 2011

(87) PCT Pub. No.: WO2010/016438
PCT Pub. Date: Feb. 11, 2010

(65) Prior Publication Data
US 2011/0126528 A1    Jun. 2, 2011

(30) Foreign Application Priority Data

Aug. 4, 2008  (JP) ................................. 2008-200566

(51) Int. Cl.
*F01N 3/10*  (2006.01)
*F01N 1/00*  (2006.01)
*B01D 50/00* (2006.01)

(52) U.S. Cl.
USPC .................. 60/323; 60/299; 60/302; 422/169; 422/170; 422/171

(58) Field of Classification Search
USPC ............ 60/299, 301, 302, 323; 422/169–171; 423/213.2, 213.5, 213.7; 502/325, 326, 502/339, 527.12, 527.13
See application file for complete search history.

(56) References Cited

U.S. PATENT DOCUMENTS

| | | | |
|---|---|---|---|
| 3,470,690 A * | 10/1969 | Thompson ...................... | 60/303 |
| 5,538,697 A | 7/1996 | Abe et al. | |
| 6,082,103 A | 7/2000 | Sugiura et al. | |
| 2003/0056505 A1 | 3/2003 | Havemann et al. | |
| 2003/0121252 A1* | 7/2003 | Huh ................................ | 60/302 |
| 2003/0131594 A1 | 7/2003 | Kawamizu | |

(Continued)

FOREIGN PATENT DOCUMENTS

| EP | 0 661 098 A2 | 12/1994 |
|---|---|---|
| EP | 1 329 606 A2 | 7/2003 |

(Continued)

OTHER PUBLICATIONS

Extended European Search report issued to EP Application No. 09804922, mailed Jun. 28, 2011.

(Continued)

*Primary Examiner* — Kenneth Bomberg
*Assistant Examiner* — Audrey K Bradley
(74) *Attorney, Agent, or Firm* — Arent Fox LLP

(57) ABSTRACT

An exhaust gas purifying device is provided with an exhaust manifold having a collecting section, and a catalytic converter provided downstream of the exhaust manifold. The catalytic converter has upstream and downstream catalysts. The upstream catalyst includes a carrier, a first layer located on the carrier containing Pd, a second layer located on the first layer containing Rh, and a third layer located on the second layer containing Pd. The downstream catalyst includes a carrier, a first layer located on the carrier containing Pd, and a second layer located on the first layer containing Pt and Rh. The collecting section connects to the catalytic converter after passing, in order from the upstream side, through a flow regulating path and a neck section which is provided in the flow regulating path. The flow regulating path has a predetermined length and a width which is gradually reduced to the downstream side.

5 Claims, 9 Drawing Sheets

(56) References Cited

U.S. PATENT DOCUMENTS

| | | | |
|---|---|---|---|
| 2005/0241303 A1* | 11/2005 | Nording et al. | 60/323 |
| 2006/0217263 A1 | 9/2006 | Kawamoto et al. | |
| 2007/0283686 A1 | 12/2007 | Ohkubo et al. | |
| 2008/0044329 A1 | 2/2008 | Chen et al. | |
| 2009/0105070 A1 | 4/2009 | Tanabe et al. | |

FOREIGN PATENT DOCUMENTS

| | | |
|---|---|---|
| JP | 58-101210 A | 6/1983 |
| JP | 7-232084 A | 9/1995 |
| JP | 2001-304016 A | 10/2001 |
| JP | 2002-322909 A | 11/2002 |
| JP | 2006-263583 A | 10/2006 |
| JP | 2007-278100 A | 10/2007 |
| JP | 2008-18418 A | 1/2008 |
| WO | WO 99/35431 A1 | 7/1999 |

OTHER PUBLICATIONS

Notice of Reasons for Rejection issued in Chinese Patent Application No. 200980130365.3, issued Apr. 1, 2013.

* cited by examiner

EXHAUST GAS PURIFYING DEVICE

CROSS-REFERENCE TO RELATED APPLICATION

This application is a National Stage entry of International Application No. PCT/JP2009/063662, filed Jul. 31, 2009, which claims priority to Japanese Patent Application No. 2008-200566, filed Aug. 4, 2008 the disclosure of the prior applications are incorporated in its entirety by reference

TECHNICAL FIELD

The present invention relates to an exhaust gas purifying device that purifies exhaust gas emitted from an internal combustion engine.

BACKGROUND ART

In recent years, regulations aimed at hazardous substances such as NMOG (Non-methane Organic Gas) and NOx etc. remaining in the exhaust gas of internal combustion engines for automobiles (hereinafter referred to as "engine") have been becoming stricter to decrease the burden on the environment. For example, PZEV (Partial Zero Emission Vehicle), established by the state of California in the United States of America, is one of the most severe regulations, and few automobiles among the currently marketed automobiles satisfy the regulation. As a result, an exhaust gas purifying device for engines has been demanded that has higher exhaust gas purification ability.

Generally, an exhaust gas purifying device is provided with a catalytic converter in an exhaust gas flow path, and purifies NMOG, NOx, etc. with this catalytic converter. With an exemplary exhaust gas purifying device, the catalytic converter is provided directly below the engine so that high temperature exhaust gas is supplied thereto and the time taken to warm up can be shortened.

However, since catalyst degradation due to heat is intense with such a device, it is necessary to increase the amount of noble metal used in order to supplement the performance decline due to thermal degradation, which leads to high cost.

Consequently, in the exhaust gas purifying device illustrated in Patent Document 1, a first catalytic converter is provided directly below the engine, and a second catalytic converter that is separated from this first catalytic converter is provided under the floor of the automobile (refer to Patent Document 1). According to this device, the performance decline due to heat degradation can be suppressed since exhaust gas in a somewhat lowered temperature state is supplied to the second catalytic converter.

Patent Document 1: Japanese Unexamined Patent Application Publication No. 2007-278100

DISCLOSURE OF THE INVENTION

Problems to be Solved by the Invention

However, since time is required in the temperature rise of the second catalytic converter in the exhaust gas purifying device illustrated in Patent Document 1, there is no other choice but to ultimately increase the amount of noble metal used in order to shorten this time.

The present invention was made taking into account of the above situation, and has an object of providing an exhaust gas purifying device that can maintain sufficient exhaust gas purification performance and can lower the amount of noble metal used.

Means for Solving the Problems

According to a first aspect of the invention, an exhaust gas purifying device that purifies exhaust gas emitted from an internal combustion engine, includes:

an exhaust manifold including a plurality of runners provided to exhaust ports of the internal combustion engine and a collector at which all of the runners merge; and a catalytic converter that is provided immediately downstream of the exhaust manifold, in which the catalytic converter has an upstream catalyst that is housed on an upstream side, and a downstream catalyst that is housed downstream of the upstream catalyst, the upstream catalyst has a carrier, an upstream first layer disposed on the carrier and containing Pd, an upstream second layer disposed on the upstream first layer and containing Rh, and an upstream third layer disposed on the upstream second layer and containing Pd, the downstream catalyst has a carrier, a downstream first layer disposed on the carrier and containing Pd, and a downstream second layer disposed on the downstream first layer and containing Pt and Rh, and the collector is in communication with the catalytic converter via, in order from upstream, a flow regulating path of a predetermined length that rectifies the exhaust gas and has a width that gradually narrows to a downstream side, and a neck portion that is provided to the flow regulating path.

According to the first aspect of the invention, the temperature of the exhaust gas supplied to the catalytic converter is high since the catalytic converter is provided immediately downstream of the exhaust manifold. This high temperature exhaust gas sufficiently rectified by the flow regulating path of a predetermined length, and then flows into the neck portion. Herein, since the flow regulating path is configured to gradually narrow in width to the downstream side, the width of the neck portion pointed end provided to the flow regulating path is also narrow, and since the radius of curvature R is small, circling of the exhaust gas is suppressed.

Since high temperature exhaust gas is provided to the upstream catalyst in a state in which circling and diffusing thereof is suppressed by configuring in this way, it efficiently reaches over the entirety of the upstream catalyst, a result of which the upstream catalyst rapidly rises in temperature to cause the purification reaction to initiate.

On the other hand, since high temperature exhaust gas is provided locally to a portion of the catalyst by applying the above-mentioned configuration, degradation of the catalyst due to heat is a concern. However, according to the first aspect of the invention, due to excelling in heat resistance, the upstream catalyst and the downstream catalyst suppress degradation due to heat and also simultaneously purify NOx, NMOG, HC, CO, etc. Therefore, it is possible to maintain sufficient exhaust gas purification performance and reduce the amount of noble metal used.

In addition, since a majority of the exhaust gas is detected by the air/fuel ratio sensor from providing the air/fuel ratio sensor at a portion narrow in width, the detection sensitivity can be improved.

The "predetermined length" may be appropriately set by taking into account that the temperature of the exhaust gas will decline if too long, and the rectification of the exhaust gas will be insufficient if too short.

According to a second aspect of the invention, in the exhaust gas purifying device as described in the first aspect, the flow regulating path is curved on a side thereof at the catalytic converter.

According to the second aspect of the invention, since the flow regulating path curves at the catalytic converter side thereof to approach thereto, the neck portion interposed between the flow regulating path and the catalytic converter can be reduced in size, thereby enabling design to further decrease the volume thereof. As a result thereof, a situation in which the exhaust gas flowed to the neck portion diffuses and is randomly flowed to the outer circumferential portion of the upstream catalyst is suppressed, and the exhaust gas is supplied to the upstream catalyst in a state more highly rectified, whereby the purification reaction is more rapidly initiated. Consequently, it is possible to further decrease the amount of noble metal used.

According to a third aspect of the invention, in the exhaust gas purifying device as described in the first or second aspect, Pd or Rh is supported on a support containing an oxygen storage material in at least one of the upstream first layer and the upstream second layer.

According to the third aspect of the invention, since oxygen generated from reaction and the like is stored in the oxygen storage material, the oxidizing of Pd by the NOx purification reaction is suppressed. In addition, since the upstream first layer and the upstream second layer are covered with the upstream third layer, poisoning of the oxygen storage material is suppressed. This enables high purification performance to continue over an extended time period.

According to a fourth aspect of the invention, in the exhaust gas purifying device as described in any one of the first to third aspects, the upstream catalyst further contains a base metal oxide in the upstream third layer.

According to the fourth aspect of the invention, since the base metal oxide is adjacent to the Pd in the upstream third layer, oxidation of Pd is promoted, and the purification performance of HC and CO can be further improved.

According to a fifth aspect of the invention, in the exhaust gas purifying device as described in any one of the first to fourth aspects, Pd is supported on a support containing an oxygen storage material in the downstream first layer.

According to the fifth aspect of the invention, since oxygen generated from reaction and the like is stored in the oxygen storage material, the oxidizing of Pd by the NOx purification reaction is suppressed. In addition, since the downstream first layer is covered by the downstream second layer, poisoning of the oxygen storage material is suppressed. This enables high purification performance to continue over an extended time period.

According to a sixth aspect of the invention, in the exhaust gas purifying device as described in any one of the first to fifth aspects, an irreducible metallic oxide of a metal containing at least one selected from the group consisting of Ba, Ca, Mg and Sr is coated on a support, and Rh is further supported in at least one of the upstream second layer and the downstream second layer.

According to the sixth aspect, since oxidation of Rh and incorporation thereof into the solid solution (implanting) of the support are suppressed, the required amount of Rh used can be further decreased.

Effects of the Invention

According to the present invention, since a catalytic converter is provided immediately downstream of the exhaust manifold, the temperature of the exhaust gas supplied to the catalyst converter is high. After this high temperature exhaust gas is sufficiently rectified by a flow regulating path of a predetermined length, it flows into the neck portion. Herein, since the flow regulating path is configured to gradually narrow in width to the downstream side, the width of the neck portion pointed end provided in the flow regulating path is also narrow, and the radius of curvature R is small, whereby circling of the exhaust gas is suppressed.

Since high temperature exhaust gas is provided to the upstream catalyst in a state in which circling and diffusing thereof is suppressed by configuring in this way, it efficiently reaches over the entirety of the upstream catalyst, a result of which the upstream catalyst rapidly rises in temperature to cause the purification reaction to initiate.

In addition, the upstream catalyst and the downstream catalyst excel in heat resistance, and thus suppress degradation due to heat and also simultaneously purify NOx, NMOG, HC, CO, etc. Therefore, it is possible to maintain sufficient exhaust gas purification performance and reduce the amount of noble metal used.

PREFERRED MODE FOR CARRYING OUT THE INVENTION

Figure 1:
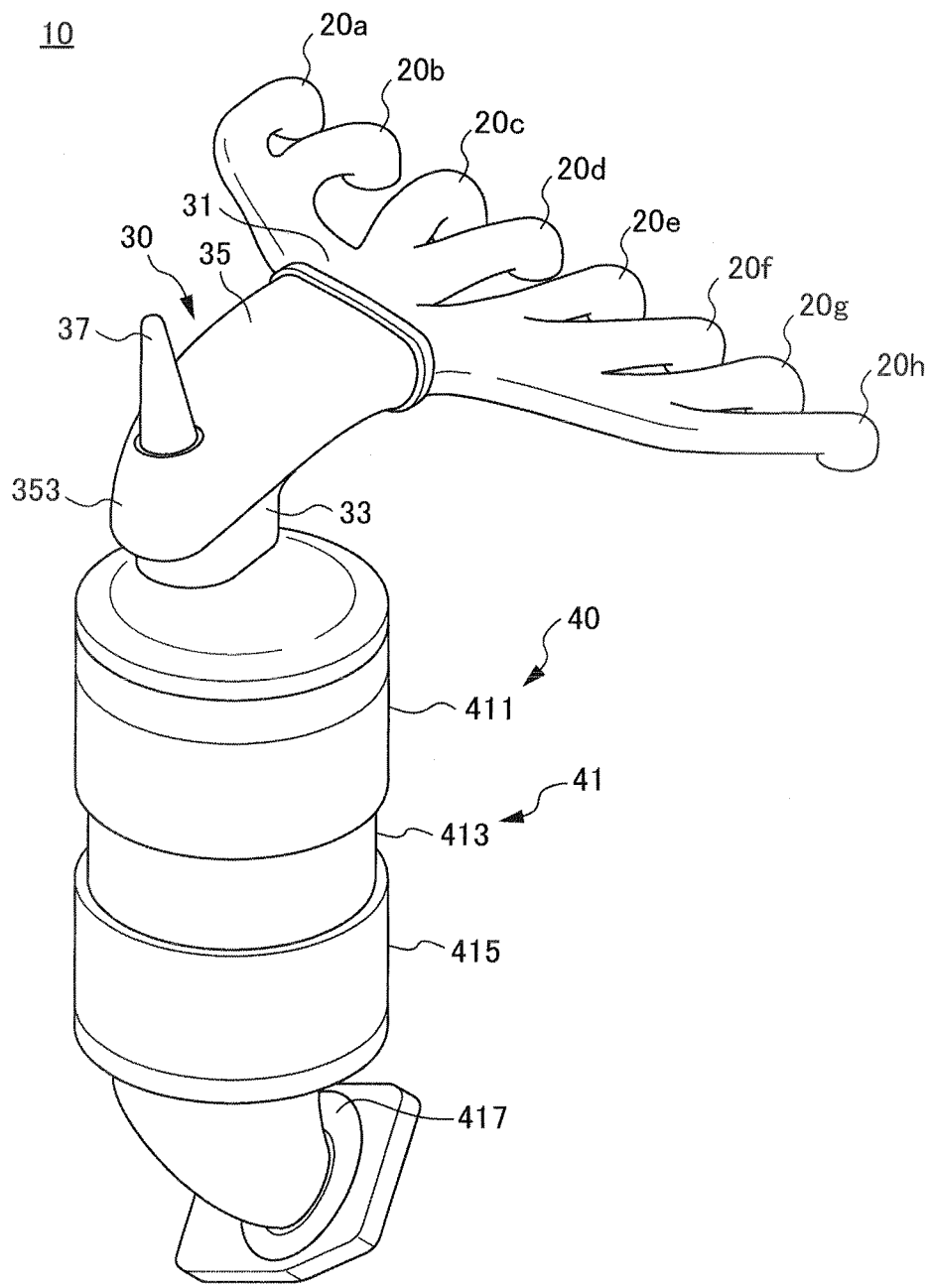
FIG. 1 is an overall perspective view of an exhaust gas purifying device according to an embodiment of the present invention.
Figure 2:
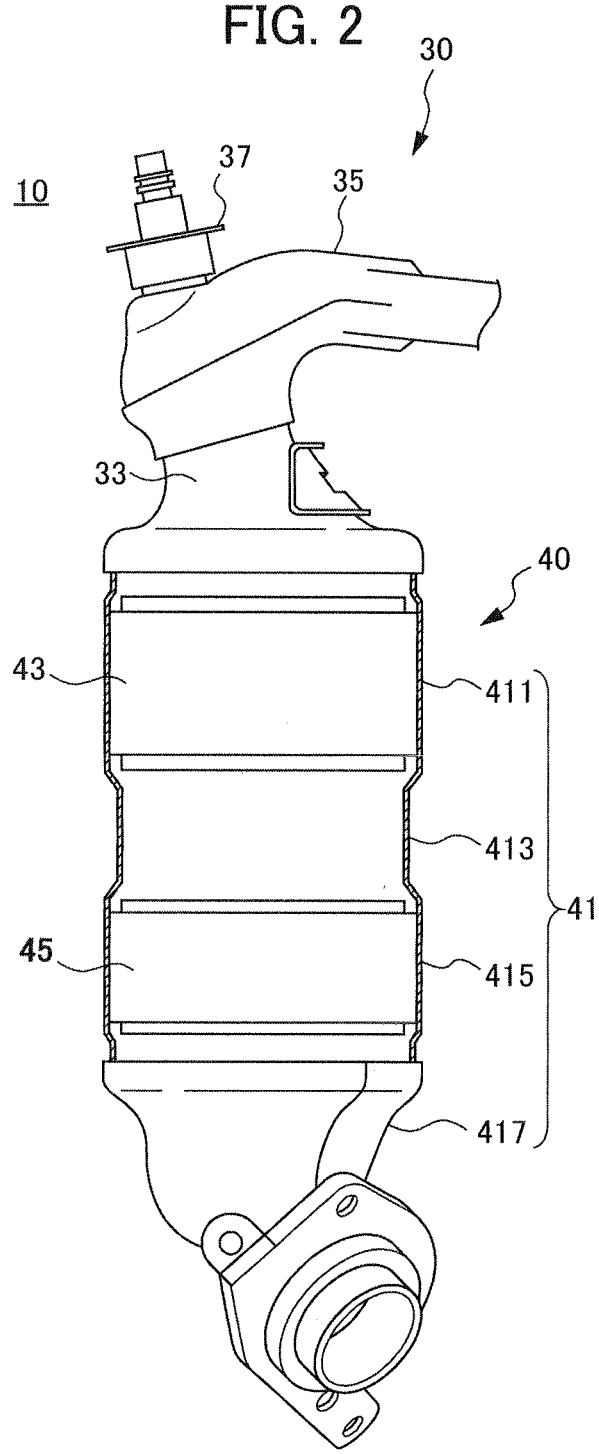
FIG. 2 is a partial cross-sectional view of the exhaust gas purifying device of FIG. 1.

Hereinafter, an embodiment of the present invention will be explained while referring to the drawings. FIG. 1 is an overall perspective view of an exhaust gas purifying device 10 according to an embodiment of the present invention. FIG. 2 is a partial cross-sectional view of the exhaust gas purifying device 10 of FIG. 1. The exhaust gas purifying device 10 includes an exhaust manifold 30 and a catalytic converter 40. Each component will be explained in detail hereinafter.

The exhaust manifold 30 includes a plurality of runners 20a to 20h connected to the cylinders of an engine (internal combustion engine), which is not illustrated, and all of these runners 20a to 20h merge at a collector 31. The exhaust gas from the engine is thereby merged via the runners 20a to 20h at the collector 31. This collector 31 is made to be in communication with the catalytic converter 40 by way of the neck portion 33; therefore, the exhaust gas merged at the collector 31 is supplied to the catalytic converter 40.

Figure 3:
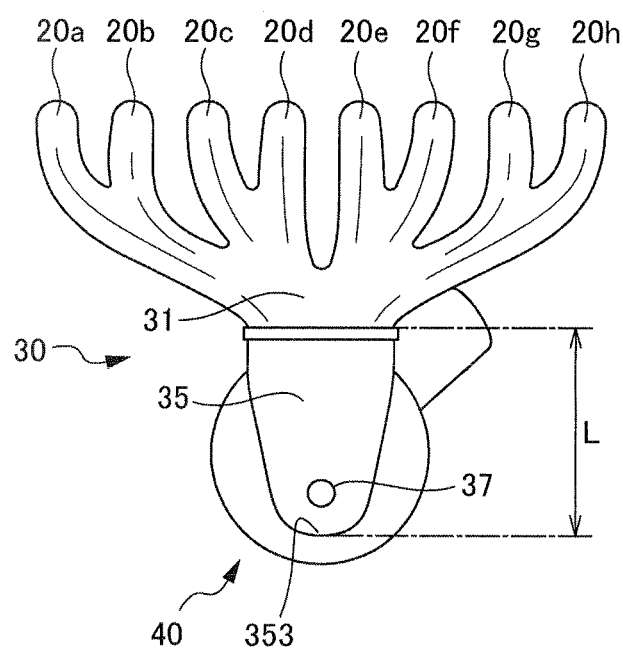
FIG. 3 is a plan view of the exhaust gas purifying device of FIG. 2.

Herein, a flow regulating path 35 is provided between the collector 31 and the neck portion 33, and the exhaust gas is supplied to the catalytic converter 40 after being rectified by the flow regulating path 35. More specifically, as shown in FIG. 3, the flow regulating path 35 is a shape in which the width (herein, the width of the flow regulating path indicates the inside diameter of the flow regulating path in a virtual plane in which the runners extend (surface represented in FIG. 3)) gradually narrows to the downstream side, and has a predetermined length L (length of central portion of the flow regulating path 35). The predetermined length L may be appropriately set by taking into account that the temperature of the exhaust gas will decline if too long, and the rectification of the exhaust gas will be insufficient if too short; however, it is generally preferably longer than at least the width of the flow regulating path, and more specifically, preferably at least 100 mm. With this, the exhaust gas flowed to the flow regulating path 35 flows into the neck portion 33 after having been sufficiently rectified.

Herein, an LAF (wide-range air/fuel ratio) sensor 37 is provided at a pointed end of the flow regulating path 35, and the air/fuel ratio of exhaust gas flowed to the flow regulating path 35 is detected by this LAF sensor 37. Since the pointed end of the flow regulating path 35 is a narrow width, a majority of the exhaust gas is detected by the LAF sensor, a result of which the detection sensitivity can be dramatically improved, and control of the air/fuel ratio can be further raised in accuracy. The width of the flow regulating path 35 at the position at which the LAF sensor 37 is provided in not particularly limited; however, it is preferably no more than 65 mm so as to be able to ensure sufficient detection sensitivity.

In addition, since the flow regulating path 35 narrows in width to the downstream side, the width of the neck portion 33 provided to the flow regulating path 35 is also narrow, and the radius of curvature R of an end surface 353 of the flow regulating path 35 decreases. As a result of the diffusing and circling of the exhaust gas passing through the neck portion 33 being suppress by the radius of curvature R of the end surface 353 decreasing in this way, the exhaust gas emitted from each cylinder efficiently spreads over the entirety of the upstream catalyst 43, and the upstream catalyst 43 rapidly rises in temperature to initiate the purification reaction.

Figure 8A:
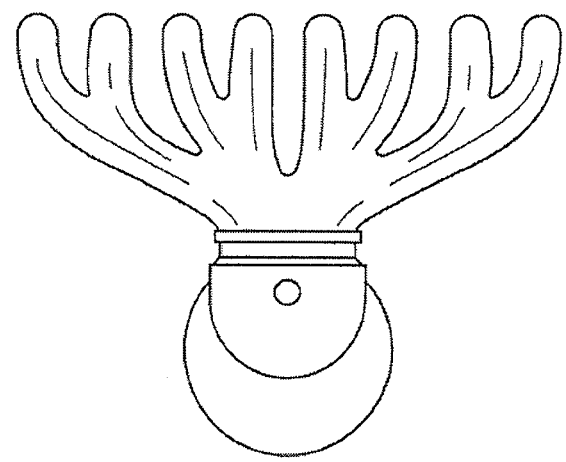
FIGS. 8A and 8B show the shapes of the flow regulating path and the neck portion of the exhaust gas purifying device according to a conventional example.
Figure 8B:
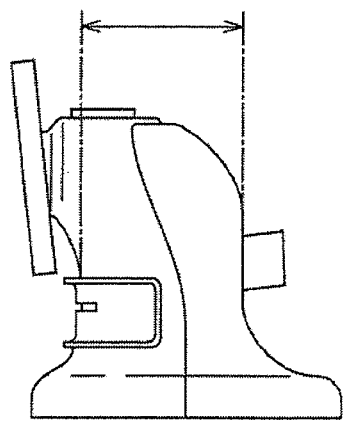

In contrast to this, with the exhaust gas flow path of the exhaust gas purification device according to the conventional example, the flow path does not gradually narrow in width, the radius of curvature R of the end surface is large, and the volume of the neck portion is also large. As a result, after the exhaust gas emitted from each cylinder has diffused in the neck portion, particularly after the exhaust gas having passed through the middle of the exhaust manifold has circled, each is supplied to the upstream catalyst. As a result thereof, the spreading of exhaust gas to the upstream catalyst is nonuniform, and the temperature rise of the catalyst lags behind. In addition, since the width of the flow regulating path at the installation position of the LAF sensor is wide (FIGS. 8A and 8B), the detection sensitivity also tends to be insufficient.

Referring back to FIG. 1, since the catalytic converter 40 is provided immediately downstream of the exhaust manifold 30, high temperature exhaust gas is supplied thereto. Herein, the catalytic converter 40 houses the upstream catalyst 43 and the downstream catalyst 45 in order from upstream in a casing 41, and purifies exhaust gas with the action of the upstream catalyst 43 and the downstream catalyst 45. More specifically, the upstream catalyst 43 is housed inside a first enlarged diameter chamber 411 in the casing 41, and the downstream catalyst 45 is housed inside a second enlarged diameter chamber 415 provided to sandwich a reduced diameter interposed portion 413. This makes the gas permeated through the upstream catalyst 43 to be introduced into the downstream catalyst 45 after having passed through the reduced diameter interposed portion 413.

Figure 4:
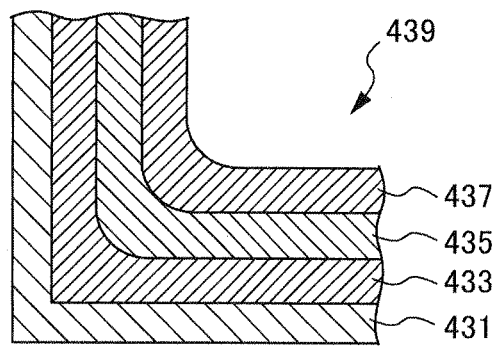
FIG. 4 is a partially enlarged view of an upstream catalyst provided by the exhaust gas purifying device of FIG. 2.
Figure 5:
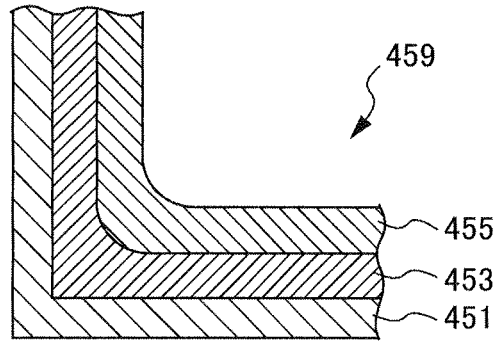
FIG. 5 is a partially enlarged view of a downstream catalyst provided by the exhaust gas purifying device of FIG. 2.

FIG. 4 is a partially enlarged cross-sectional view of the upstream catalyst 43, and FIG. 5 is a partially enlarged cross-sectional view of the downstream catalyst 45. Hereinafter, the configurations of the upstream catalyst 43 and the downstream catalyst 45 will be explained in detail while referring to FIGS. 4 and 5.

The upstream catalyst 43 is a so-called TWC catalyst, and can simultaneously carry out the oxidation of HC and CO and the reduction of NOx. As shown in FIG. 4, this upstream catalyst 43 includes a carrier 431 of a honeycomb structure, an upstream first layer 433 disposed on this carrier 431, an upstream second layer 435 disposed on this upstream first layer 433, and an upstream third layer 437 disposed on this upstream second layer 435.

Figure 7:
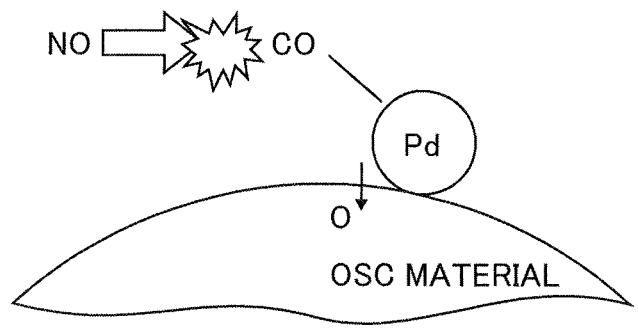
FIG. 7 is a conceptual diagram of a reaction related to exhaust gas purification.

The upstream first layer 433 contains Pd, and mainly carries out the reduction of NOx with the action of this Pd. If the oxidation of Pd progresses in this process, the NOx reducing efficiency will decline soon after; therefore, it is preferable for the Pd to be loaded on a support made from an oxygen storage (OSC) material. With this, the oxidation of Pd is suppressed by the oxygen being stored in the oxygen storage material, and thus the amount of Pd used can be decreased while maintaining the reducing efficiency of NOx (refer to FIG. 7). Although not particularly limited, at least one oxide of a rare earth element such as cerium, zirconium, lanthanum, samarium, gadolinium, neodymium can be exemplified as such an oxygen storage material.

The upstream second layer 435 contains Rh, and carries out purification of HC and NOx with the action of this Rh. In this process, there is a tendency for Rh to be oxidized and to be incorporated into the solid solution (implanting) of the support such as alumina, soon followed by the purification performance of HC and NOx declining; therefore, Rh is preferably loaded on an irreducible metallic oxide coated on the support. With this, since oxidation of Rh and incorporation thereof into the solid solution (implanting) of the support are suppressed, the required amount of Rh used can be further decreased while maintaining the purification performance of HC and NOx. Although such an irreducible metallic oxide is not particularly limited, it is an oxide of a metal from at least one selected from the group consisting of Ba, Ca, Mg and Sr. In addition, similarly to the upstream first layer 433, Rh is preferably loaded on the support made from an oxygen storage material in the upstream second layer 435.

Figure 6:
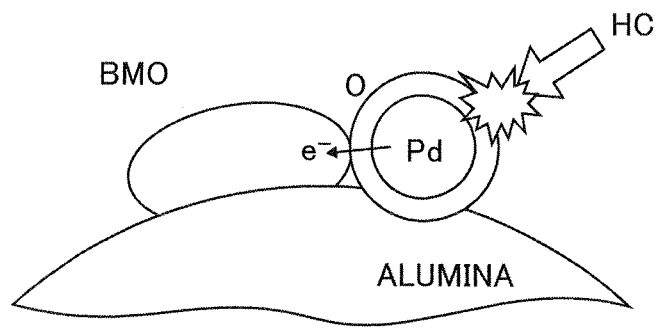
FIG. 6 is a conceptual diagram of a reaction related to exhaust gas purification.

The upstream third layer 437 contains Pd, and carries out oxidation of HC with the action of this Pd. Herein, the upstream third layer 437 preferably further contains a base metal oxide (BMO). As a result, since the base metal oxide is adjacent to the Pd, oxidation of Pd (PdO formation) is promoted, and the purification performance of HC and CO can be further improved (refer to FIG. 6). Similarly to the other layers, Pd is preferably loaded on a well-known support such as alumina in the upstream third layer 437 as well. Although not particularly limited, oxides such as of barium, calcium, manganese and strontium can be exemplified as the base metal oxide.

The downstream catalyst 45 can simultaneously carry out the oxidation of HC and CO and the reduction of NOx. As shown in FIG. 5, such a downstream catalyst 45 includes a carrier 451 of honeycomb structure, a downstream first layer 453 disposed on this carrier 451, and a downstream second layer 455 disposed on this downstream first layer 453.

The downstream first layer 453 contains Pd, and mainly carries out the reduction of NOx with the action of this Pd. Generally, Pd has poor compatibility with Pt and Rh, and tends to alloy with these and cause the catalyst performance to decline; however, since the downstream first layer 453 and the downstream second layer 455 are separately divided, a decline in catalyst performance can be suppressed. In addition, although Pd also tends to form granules, cover other catalyst surfaces, and cause the performance to decline if exposed to high temperature gas, since a direct collision of high temperature gas is prevented in the present invention by being coated with the upstream second layer 455, a decline in the purification performance can be suppressed.

In the downstream first layer 453, since the NOx reducing efficiency will decline soon after if the oxidation of Pd progresses in the process of NOx reduction, it is preferable for the Pd to be loaded on a support made of an oxygen storage (OSC) material. As a result, since the oxidation of Pd is suppressed by oxygen being stored in the oxygen storage material, it is possible to reduce the amount of Pd used while maintaining the reducing efficiency of NOx. Preferred examples of the oxygen storage material are the same as those explained for the upstream first layer 433.

The downstream second layer 455 contains Rh, and mainly carries out the purification of HC and NOx with the action of this Rh. The downstream second layer 455 of the present invention further contains Pt; therefore, the steam reforming (SR) reaction is progressed and the oxidation of NOx can be further improved. It should be noted that, although Pt also tends to form granules, cover other catalyst surfaces, and cause the performance to decline if exposed to high temperature gas, since gas that has somewhat lowered in temperature by having passed through the upstream catalyst 43 and reduced diameter interposed portion 413 contacts the Pt, a decline in the purification performance can be suppressed.

The upstream catalyst 43 and the downstream catalyst 45 can be prepared in the following such sequence. First, the raw material powder of the support and a noble metal component are dispersed in a solvent (e.g., water) to prepare a slurry. A washcoat layer (first layer) is formed on the carrier by immersing a honeycomb base material as the carrier in this slurry, extracting and drying, and then calcining. It should be noted that the concentration of the slurry has been suitably adjusted so as to make a predetermined washcoat layer thickness. By sequentially repeating such a process, new washcoat layers (second layer and up) are formed on a washcoat layer that has already been formed.

The gas after having passed through the above upstream catalyst 43 and downstream catalyst 45 passes a converter outlet pipe 417, flows out to an exhaust pipe that is not illustrated to pass under the floor of the vehicle and be emitted to outside. This gas emitted to outside is sufficiently purified by the upstream catalyst 43 and the downstream catalyst 45; therefore, the content of NOx and NMOG thereof is drastically reduced.

EXAMPLES

The following evaluation was performed by connecting, to the exhaust ports of a gasoline engine of 4-cylinder, 1800 cc displacement, the exhaust gas purifying device 10 (present invention) in which the flow regulating path 35 is 125 mm long and gradually narrows in width to the downstream side, and the radius of curvature of the end surface is 20 mm; an exhaust gas purifying device (conventional example 1, refer to FIGS. 8A and 8B) that differs from the exhaust gas purifying device 10 in the aspects of the flow regulating path 35 being 90 mm long, the width being substantially constant, and the radius of curvature of the end surface being 32.5 mm; and an exhaust gas purifying device (conventional example 2) that differs from the exhaust gas purifying device 10 in the aspects of being a structure (dual-Y structure) in which the runners 20a to 20d and runners 20e to 20e are merged separately, and these merged pipes (70 mm in length) further merge. It should be noted that the carrier used was a cordierite honeycomb support of 600 cells, 3.5 mils, and 0.8 L in both the upstream catalyst and the downstream catalyst.

Gas Exchangeability

For the air/fuel ratio of the overall exhaust gas, the change in the degree of contribution of the air/fuel ratio of the exhaust gas emitted every reciprocal (180°) turn of the crank was calculated with the LAF sensor 37, while measuring the crank angle by a crank angle sensor (not illustrated) provided to the crank shaft of the engine.

As a result, it was found that the degree of mixing of the exhaust gas emitted every reciprocal turn of the crank was large, and the gas exchangeability at the LAF sensor was low at 75% with the exhaust gas purifying device of the conventional example 1; whereas, the exhaust gas emitted every reciprocal turn of the crank was highly separated from each other, and the gas exchangeability at the LAF sensor was extremely high at 90% with the exhaust gas purifying device of the Example. This suggests that the exhaust gas purifying device of the Example can precisely perform air/fuel ratio control. It should be noted that gas exchangeability indicates the average value of the contribution ratio for each cylinder in one cycle.

Heat Capacity

The exhaust gas temperature was measured with a temperature sensor (not illustrated) provided to a neck portion of the exhaust manifold, and the amount of heat required to raise this exhaust temperature by 1° C. was calculated. The results thereof are shown in FIG. 9.

Figure 9:
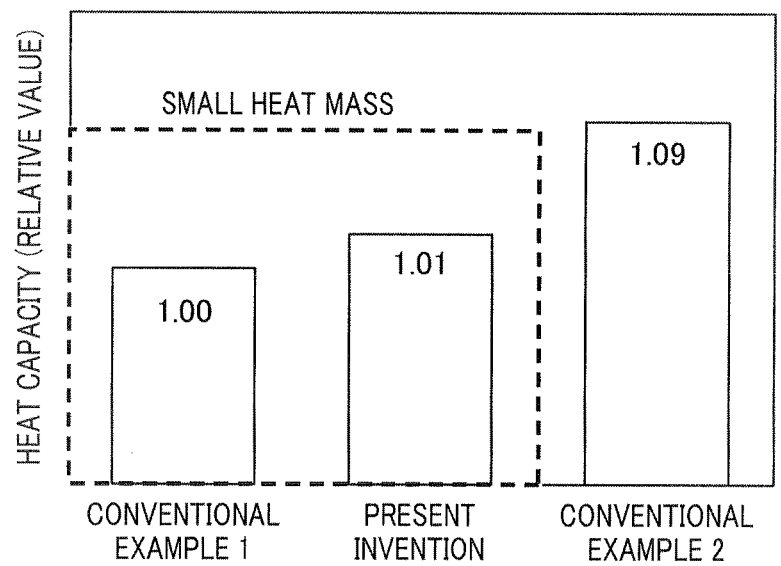
FIG. 9 is a graph showing the purification performance of the exhaust gas purifying device according to an example of the present invention.

As shown in FIG. 9, it was found that high temperature exhaust gas can be efficiently supplied to the catalytic converter with the exhaust gas purifying devices of the present invention and conventional example 1, since the heat capacity thereof is low. In contrast, with the exhaust gas purifying device of the conventional example 2, it is found that the heat capacity is high, and thus the temperature decline of the exhaust gas is sudden. More specifically, the heat capacity of the exhaust gas purifying devices of the present invention and conventional example 1 is approximately 10% lower that of convention example 2. As a result, it is assumed that the catalyst can be rapidly raised in temperature to initiate purification by having all the runners merge at one location.

Exhaust Gas Characteristics

Figure 10:
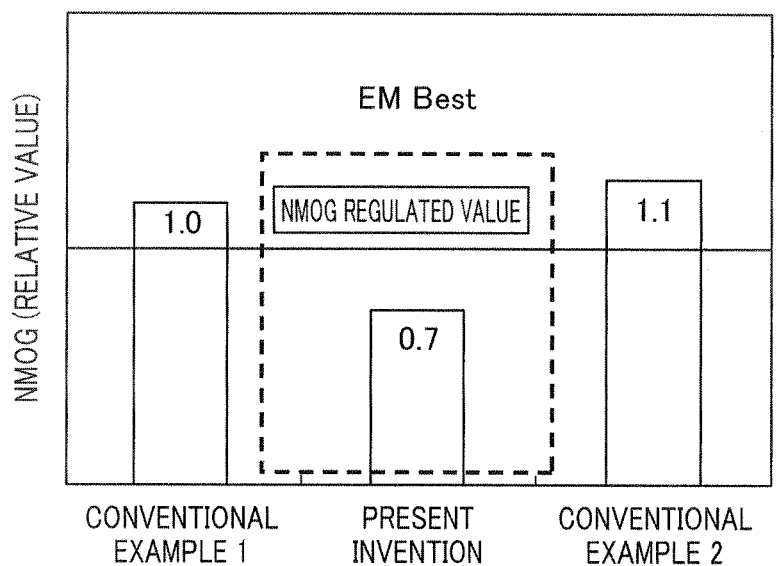
FIG. 10 is a graph showing the purification performance of the exhaust gas purifying device according to an example of the present invention.
Figure 11:
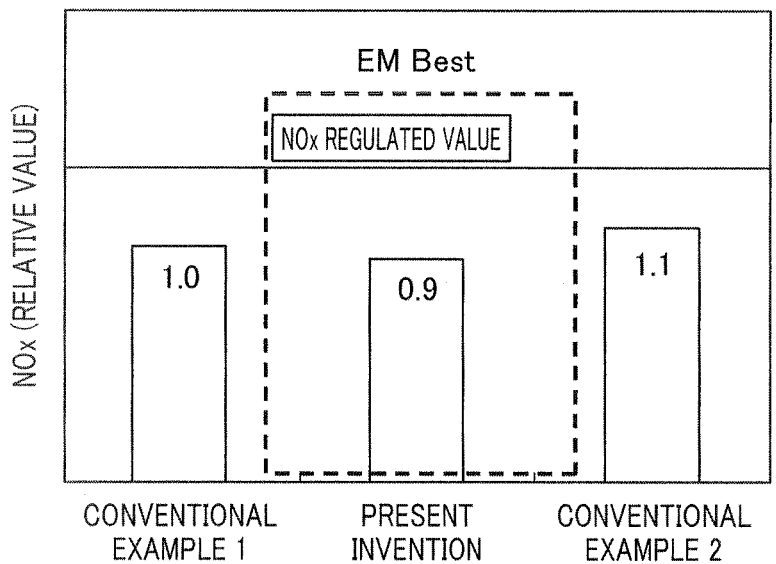
FIG. 11 is a graph showing the purification performance of the exhaust gas purifying device according to an example of the present invention.

Next, a vehicle in which the exhaust gas purifying device of the present invention and conventional examples 1 and 2 were equipped was run in LA4 mode, and the amounts of NMOG and NOx emitted in this time were measured. The results thereof are shown in FIGS. 10 and 11, respectively. In addition, the relationships between the engine revolution speed (NE), ignition timing (IGLOG, calculating method refers to Japanese Unexamined Patent Application Publication No. 2004-346915, etc.), vehicle speed (VP), and upstream catalyst temperature (CAT temperature) are shown in FIG. 12.

Figure 12:
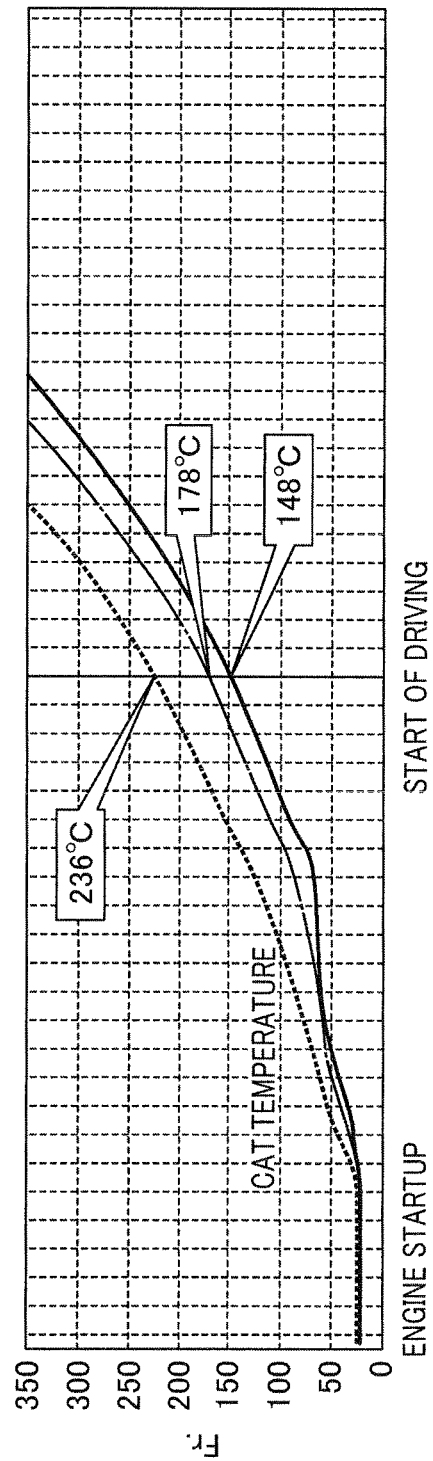
FIG. 12 is a graph showing the change in the catalyst temperature of the exhaust gas purifying device according to an example of the present invention.

As shown in FIG. 12, with the exhaust gas purifying device of the present invention, the upstream catalyst rapidly rose in temperature with the startup of the engine, and reached 236° C. during the start of driving. In contrast, with the exhaust gas purifying devices of conventional examples 1 and 2, the temperature rise of the upstream catalyst was gradual, and the catalyst did not sufficiently rise in temperature during the start of driving (conventional example 1: 178° C.; conventional example 2: 148° C.). The cause for a large difference arising in the rising rate of the catalyst temperature (FIG. 12) when comparing the present invention and conventional example 1, despite the lack of a large difference in the heat capacity of the exhaust gas temperature rise (refer to FIG. 9), is assumed to be the existence or nonexistence of rectification of the exhaust gas by the flow regulating path 35 and the neck portion 33.

As shown in FIG. 10, with the exhaust gas purifying device of the present invention, the amount of NMOG emitted is about 30 to 40% less than conventional examples 1 and 2, and falls below the regulated value, which cannot be achieved by the conventional examples 1 and 2, and thus it was found that the NMOG is sufficiently purified. In addition, it was found that the exhaust gas purifying device of the present invention is most superior also for NOx purification performance, as shown in FIG. 11. As a result thereof, it was found that the PZEV regulated values, which could not be entirely achieved by the exhaust gas purifying devices of conventional specifications (not conventional examples 1 and 2), can also be achieved to a high level by the exhaust gas purifying device of the present invention.

The present invention is not to be limited to the embodiment, and various modifications and improvements within a scope that can achieve the object of the present invention are included in the present invention. For example, US Patent No. 2008/0042104 and Patent Document 1 may be referred to for preferred compositions and production methods of catalysts.

EXPLANATION OF REFERENCE NUMERALS 10 exhaust gas purifying device
20 runner
30 exhaust manifold
31 collector
33 neck portion
35 flow regulating path
37 LAF sensor
40 catalytic converter
43 upstream catalyst
431 carrier
433 upstream first layer
435 upstream second layer
437 upstream third layer
45 downstream catalyst
451 carrier
453 downstream first layer
455 downstream second layer

The invention claimed is:

1. An exhaust gas purifying device that purifies exhaust gas emitted from an internal combustion engine, comprising:
    an exhaust manifold including a plurality of runners provided to exhaust ports of the internal combustion engine and a collector at which all of the runners merge; and
    a catalytic converter that is provided immediately downstream of the exhaust manifold,
    wherein the catalytic converter has an upstream catalyst that is housed on an upstream side, and a downstream catalyst that is housed downstream of the upstream catalyst,
    wherein the upstream catalyst has a carrier, an upstream first layer disposed on the carrier and containing Pd, an upstream second layer disposed on the upstream first layer and containing Rh, and an upstream third layer disposed on the upstream second layer and containing Pd,
    wherein the downstream catalyst has a carrier, a downstream first layer disposed on the carrier and containing Pd, and a downstream second layer disposed on the downstream first layer and containing Pt and Rh, and
    wherein the collector is in communication with the catalytic converter via, in order from upstream, a flow regulating path of a predetermined length that rectifies the exhaust gas and has a width that gradually narrows to a downstream side, where the length of the flow regulating path is greater than the width of the flow regulating path at its widest point, and a neck portion that is provided to the flow regulating path,
    wherein the flow regulating path is provided between the collector and the neck portion and is curved on a side thereof at the catalytic converter.

2. The exhaust gas purifying device according to claim 1, wherein Pd or Rh is supported on a support containing an oxygen storage material in at least one of the upstream first layer and the upstream second layer.

3. The exhaust gas purifying device according to claim 1, wherein the upstream catalyst further contains a base metal oxide in the upstream third layer.

4. The exhaust gas purifying device according to claim 1, wherein Pd is supported on a support containing an oxygen storage material in the downstream first layer.

5. The exhaust gas purifying device according to claim 1, wherein an irreducible metallic oxide of a metal containing at least one selected from the group consisting of Ba, Ca, Mg and Sr is coated on a support, and Rh is further supported in at least one of the upstream second layer and the downstream second layer.

* * * * *